(12) United States Patent
Garden

(10) Patent No.: US 8,737,163 B2
(45) Date of Patent: May 27, 2014

(54) WIDE SEISMIC SOURCE SYSTEMS

(75) Inventor: Mikael (Mikaël) Garden, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 672 days.

(21) Appl. No.: 12/706,779

(22) Filed: Feb. 17, 2010

(65) Prior Publication Data

US 2011/0199857 A1 Aug. 18, 2011

(51) Int. Cl.
*G01V 1/38* (2006.01)

(52) U.S. Cl.
USPC .................................. 367/15; 367/16; 367/20

(58) Field of Classification Search
USPC ............ 181/110, 111; 367/16, 21, 23, 24, 56, 367/20, 57; 405/158, 166, 168.3; 702/14, 702/17
See application file for complete search history.

(56) References Cited

U.S. PATENT DOCUMENTS

| | | | |
|---|---|---|---|
| 3,906,352 A | 9/1975 | Parker | |
| 4,117,692 A * | 10/1978 | Oberg | 405/166 |
| 5,351,218 A | 9/1994 | Hatteland et al. | |
| 5,357,892 A | 10/1994 | Vatne et al. | |
| 6,590,831 B1 | 7/2003 | Bennett et al. | |
| 6,684,160 B1 | 1/2004 | Ozbek et al. | |
| 6,906,981 B2 * | 6/2005 | Vaage | 367/21 |
| 7,391,673 B2 * | 6/2008 | Regone et al. | 367/16 |
| 7,400,552 B2 | 7/2008 | Moldoveanu et al. | |
| 7,415,936 B2 | 8/2008 | Storteig et al. | |
| 7,426,439 B2 | 9/2008 | Ozdemir et al. | |
| 7,466,625 B2 | 12/2008 | Robertsson et al. | |
| 7,957,221 B2 * | 6/2011 | Kluver et al. | 367/24 |
| 8,094,514 B2 * | 1/2012 | Tenghamn | 367/23 |
| 2006/0246654 A1 | 11/2006 | Shin | |
| 2007/0025182 A1 | 2/2007 | Robertsson | |
| 2007/0165486 A1 | 7/2007 | Moldoveanu et al. | |
| 2008/0008037 A1 | 1/2008 | Welker | |
| 2008/0144442 A1 | 6/2008 | Combee et al. | |
| 2008/0186804 A1 | 8/2008 | Amundsen et al. | |
| 2008/0267010 A1 | 10/2008 | Moldoveau et al. | |
| 2008/0285381 A1 | 11/2008 | Moldoveanu et al. | |
| 2009/0003132 A1 | 1/2009 | Vassallo et al. | |
| 2009/0122640 A1 | 5/2009 | Hill et al. | |
| 2009/0141587 A1 | 6/2009 | Welker et al. | |

FOREIGN PATENT DOCUMENTS

WO   WO 0225315 A2 * 3/2002

OTHER PUBLICATIONS

"Pair trawling," Wikipedia last updated Dec. 17, 2008, downloaded from the Internet Archive on Mar. 17, 2013, from http://web.archive.org/web/20091028115046/http://en.wikipedia.org/wiki/Pair_trawling.*
International Search Report of PCT Application Serial No. PCT/US2011/024865 dated Aug. 31, 2011.
Cole et al., "Three-Dimensional Marine Seismic Data Acquisition Using Controlled Streamer Feathering," SEG Conference, 1984: pp. 1-3.
Cole et al., "A Circular Seismic Acquisition Technique for Marine Three-Dimensional Surveys," Offshore Technology Conference, 1985: pp. 217-220.

* cited by examiner

*Primary Examiner* — Isam Alsomiri
*Assistant Examiner* — Daniel L Murphy

(57) ABSTRACT

A wide-azimuth marine seismic survey system according to one or more aspects of the present disclosure may include a streamer array; a first source towed from a first vessel; a second source towed from a second vessel; and a supplemental offset source towed from the first vessel and the second vessel.

17 Claims, 2 Drawing Sheets

WIDE SEISMIC SOURCE SYSTEMS

BACKGROUND

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

A marine seismic acquisition survey typically involves one or more vessels towing at least one seismic streamer through a body of water believed to overlie one or more hydrocarbon-bearing formations. As those in the art having the benefit of this disclosure will appreciate, a "marine" survey may be performed not only saltwater environments, but also in fresh and brackish waters. The term "marine" is not limited to saltwater as used in this context by those in the art.

WesternGeco L.L.C. currently conducts high-resolution Q-MARINE™ surveys, in some instances covering many square kilometers. A survey vessel known as a Q-TECHNOLOGY™ vessel may conduct seismic surveys towing multiple 1,000 m-10,000 m cables with a cross-line separation of 25 m-50 m, using the WesternGeco proprietary calibrated Q-MARINE™ source. "Q" is the WesternGeco proprietary suite of advanced seismic technologies for enhanced reservoir location, description, and management.

Wide-azimuth ("WAZ") towed streamer survey data is typically acquired using multiple vessels, wherein there is at least a one vessel to one offset source ratio, for example: one streamer vessel and two source vessels; two streamer vessels and two source vessels; or one streamer vessel and three source vessels. Several wide- or rich-azimuth techniques are known to the art. Cole, R. A. et al., "A circular seismic acquisition technique for marine three dimensional surveys", Offshore Technology Conference, OTC 4864, May 6-9, 1985, Houston, Tex., described a concentric circle shooting scheme for obtaining three dimensional marine survey data around a sub-sea salt dome. Another technique was described by Cole, R. A et al., in the paper presented at the SEG conference in 1988 "Three dimensional marine data acquisition using controlled streamer feathering", where overlapping circles acquisition is proposed.

Wide azimuth seismic surveys utilize several energy sources with very large and very different offsets. Traditionally this is achieved by utilizing a dedicated source vessel for each source that is offset from the streamer array, thus requiring a one to one ratio of towing vessels with offset sources. However, the need for large offsets and multiple vessel surveys has limited the utilization of wide-azimuth surveys.

SUMMARY

According to one or more aspects of the present disclosure, a marine seismic system may include two vessels and three sources, the three sources deployed offset from one another in a cross-line direction from the two vessels. The system may include a streamer carrying a receiver. The streamer may be towed. The streamer may be towed by one of the first vessel or the second vessel. The system comprises a ratio of less than one vessel per source that is offset from the streamer array.

A wide-azimuth marine seismic survey system according to one or more aspects of the present disclosure may include a streamer array; a first source towed from a first vessel; a second source towed from a second vessel; and a supplemental offset source towed from the first vessel and the second vessel. The streamer array may be towed. The streamer array may be towed for example from the first vessel. The sources may be offset from each other by at least 100 meters. According to one or more aspects of the present disclosure, the sources are offset from each other in excess of 200 meters. The system may include a third vessel towing a third source. The system may include a second supplemental offset source towed, for example, jointly by the third vessel and one of the first vessel or the second vessel.

A method according to one or more aspects of the present disclosure comprises deploying a streamer array having receivers; towing a first source from a first vessel; towing a second source from a second vessel; and towing a supplemental source offset from the first source and offset from the second source.

The foregoing has outlined some of the features of the invention in order that the detailed description that follows may be better understood. Additional features and/or advantages of the invention will be described hereinafter which form the subject of the claims of the invention.

BRIEF DESCRIPTION OF THE DRAWINGS

The present disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
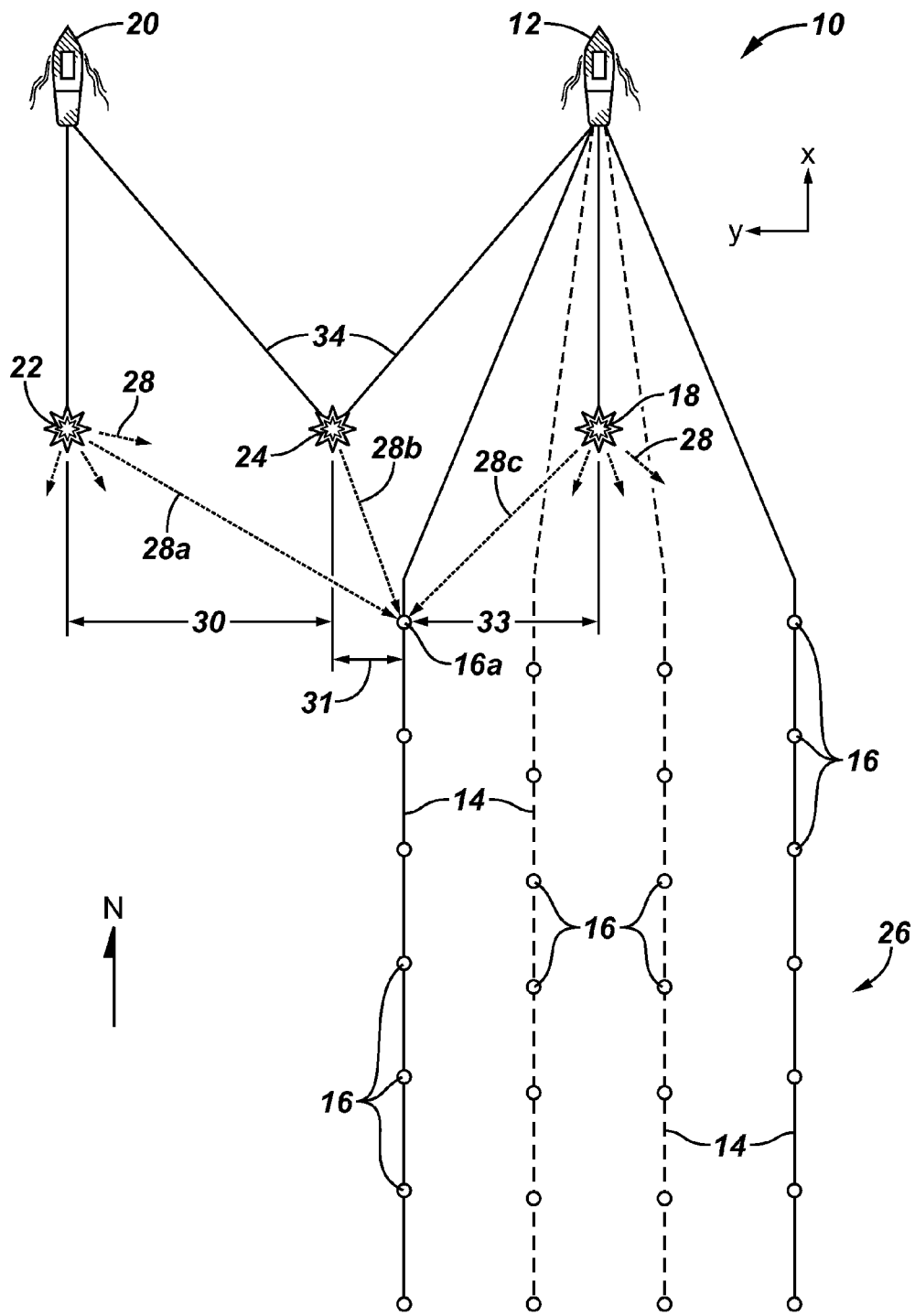
FIG. 1 is a conceptual, schematic view of a system according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Aspects of the disclosure are developed within the general context of acquiring marine seismic data in more time and cost efficient manner, which may employ computer-executable instructions, such as program modules, being executed by one or more conventional computers. Generally, program modules include routines, programs, objects, components, data structures, etc. to perform particular tasks or implement particular abstract data types. Moreover, those skilled in the art will appreciate that the disclosure may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present disclosure.

Reference is made to a towed marine seismic survey, where one or more receiver streamers are towed behind a vessel and with one or more sources towed behind the same vessel (e.g., source-streamer vessel) and/or behind source only vessels. The seismic streamers may be several thousand meters long and contain a large number of receivers (e.g., sensors), which are distributed along the length of the each seismic streamer cable. Reference may be made to the in-line direction as the direction in the horizontal plane parallel to the streamer(s). A Cartesian coordinate system will also be used where the in-line direction is referred to as the x-direction. Conversely, the cross-line direction may be referred to as the direction in the horizontal plane perpendicular to the streamer(s). In the Cartesian coordinate system, the cross-line direction is referred to as the y-direction.

The sources generate seismic waves upon being "shot", which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits. Similarly, electromagnetic (EM) surveying can use EM sources and receivers. One type of EM surveying is referred to as controlled source EM surveying (CSEM), in which an EM transmitter is used to generate EM signals that are propagated into the subterranean structure. Subterranean elements reflect the EM signals, with the reflected EM signals received by the EM receivers.

The streamers and/or sources may be steered through turns using controlled steering of streamer steering devices, and position of each seismic acoustic receiver is determined during the turns through acoustic networks, which may or may not be full streamer length acoustic networks. The ability to control the motion of the streamers and determine positions of the receivers during turns allows the marine seismic team to gather valuable reservoir and geologic data with increased efficiency. As used herein the term "turn" includes reversals, which is an art-recognized term used when a towed streamer marine seismic spread completes a first path or swath and makes a wide port or starboard curved path that is continued until the second path or swath has a heading 180 degrees different than the first path or swath.

For the case of multi-component seismic sensors, each sensor may be capable of detecting a pressure wavefield and at least one component of a particle motion that is associated with acoustic signals that are proximate to the multi-component seismic sensor. Examples of particle motions include one or more components of a particle displacement, one or more components (inline (x), cross-line (y) and vertical (z) components) of a particle velocity and one or more components of a particle acceleration. An example of a commercial multi-component system designed for ocean-bottom (also known as seabed) applications is WesternGeco's Q-Seabed™ system.

Multi-component seismic sensors may include one or more hydrophones, geophones, particle displacement sensors, particle velocity sensors, accelerometers, pressure gradient sensors, or combinations thereof. For example, in accordance with some embodiments, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the cross-line direction, and another one of the pressure gradient sensors may acquire, at a particular point, seismic data indicative of the pressure data with respect to the inline direction.

As used herein the phrase wide- and/or full azimuth seismic survey means acquiring marine seismic data through a range of (or all) angles that a direct line from a source to a receiver makes with true north for example. Examples of wide- or rich-azimuth systems are disclosed in U.S. Pat. No. 7,400,552; and U.S. Patent Application Publications 2009/0122640, 2008/0285381 and 2008/0267010, all of which are incorporated herein by reference.

FIG. 1 is a conceptual aerial schematic of a marine seismic survey system, generally denoted by the numeral 10, according to one or more aspects of the present disclosure. Some examples of marine survey systems that may be utilized in whole or in-part are disclosed in U.S. Pat. Nos. 7,466,625; 7,426,439; 7,415,936; 7,400,552; 6,684,160; 5,357,892 and 5,351,218; and U.S. Patent Application Publication Nos. 2009/0141587; 2009/0122640; 2009/0003132; 2008/0285381; 2008/0267010; 2008/0186804; 2008/0144442; 2008/0008037; 2007/0025182; 2007/0165486 and 2006/0246654; all of which are incorporated herein by reference. System 10 may be referred to herein as a wide-azimuth or wide-source seismic survey system.

System 10 depicted in FIG. 1 includes a first vessel 12 towing a plurality of streamers 14 having receivers 16 and a source 18, a second vessel 20 towing a second source 22 and a supplemental source 24 towed by the first and second vessel 12, 20. First vessel 12 may be referred to herein as a streamer vessel, streamer-source vessel or master vessel for example.

For purposes of description, the distribution of streamers 14 is referred to herein as the streamer array 26. System 10 depicted in FIGS. 1 and 2 comprise a ratio of less than one tow vessel per shot offset source, wherein the offset source is offset from the other offset source relative to receivers 16.

Sources 18, 22, 24 are depicted conceptually herein as single source points for the purpose of brevity and clarity. As is known in the art, sources 18, 22, 24 may each include one or more individual energy sources (e.g., airguns) which may be formed in an array. Each source may include one or more source arrays towed at different depths in the water column for example. Although each source 18, 22, 24 may each include two or more individual sources (e.g., arrays) the sources towed by the same vessel will have substantially the same offset (e.g., 100 meters) from the receivers relative to the substantial difference in the offset of the source(s) towed from the different vessels (e.g., greater than 100 m, greater than 500 m, etc.). Thus, for purposes of description the sources towed from a specified vessel are conceptually depicted as a single source. As is known in the art, deflector devices may be connected with the source and/or streamer cables to space the members apart from one another in the spread.

Master vessel 12 is depicted towing source 18 and streamer array 26 along a desired course indicated by the arrow "x". When each source 18, 22, 24 is shot (e.g., actuated, etc.) the energy travels along paths (e.g., azimuths) indicated schematically by arrows 28 to receivers 16 of streamer array 26. Because sources 18, 22, 24 are located in distal positions from one another relative to receivers 16 (e.g., offset), the seismic energy travels to receivers 16 along different paths/azimuths 28.

For example, source 22 is depicted in FIG. 1 offset a distance 30 in the cross-line direction from receiver 16a. Energy travels from source 22 to receiver 16a along the azimuth 28a. Source 24 is offset a distance 31 from receiver 16a and source 18 is offset a distance 33 from receiver 16a. Azimuths 28b, 28c extend between sources 24, 18 respectively. The angle of azimuths 28 may be defined relative to true North for example.

The offsets of (e.g., distances 30, 31, 33) are different from one another and/or provide a different azimuth angle relative to true North for example. For example, although the offset distance 30 of source 22 and the offset distance 33 for source 18 may be the same relative to receiver 16a, the angle of azimuths 28a and 28c are different. Thus, the energy from source 18, 22, 24 reach receiver 16 from different angles as depicted with reference to receiver 16a. A wide range of source-receiver azimuths 28 can improve the quality of the survey results. Maximizing the range of source-receiver azimuths 28 angles in a survey may be of particular importance in some geologic regions.

Traditionally, a dedicated vessel is required for each deployed offset source. For example, for each source 18, 22, 24 (FIG. 1) to be sufficiently offset from one another for example in excess of 100 meters (e.g., 200 m, 300 m, 500 m, 700 m, 1000 m or more) three dedicated towing vessels are required. According to one or more aspects of the present disclosure, at least one supplemental offset source (e.g., source 24 of FIG. 1) is deployed. Supplemental offset source is utilized herein to describe a source that is offset from at least one other source and that is not towed by a sole dedicated vessel. For example, in FIG. 1, source 18 is towed solely by first vessel 12 via primary source cable 32, source 22 is towed solely by second vessel 20 via a primary source cable 32 and supplemental offset source 24 is jointly towed by vessels 12, 20 via secondary tow member (e.g., cable, line, rope, etc.) 34.

Figure 2:
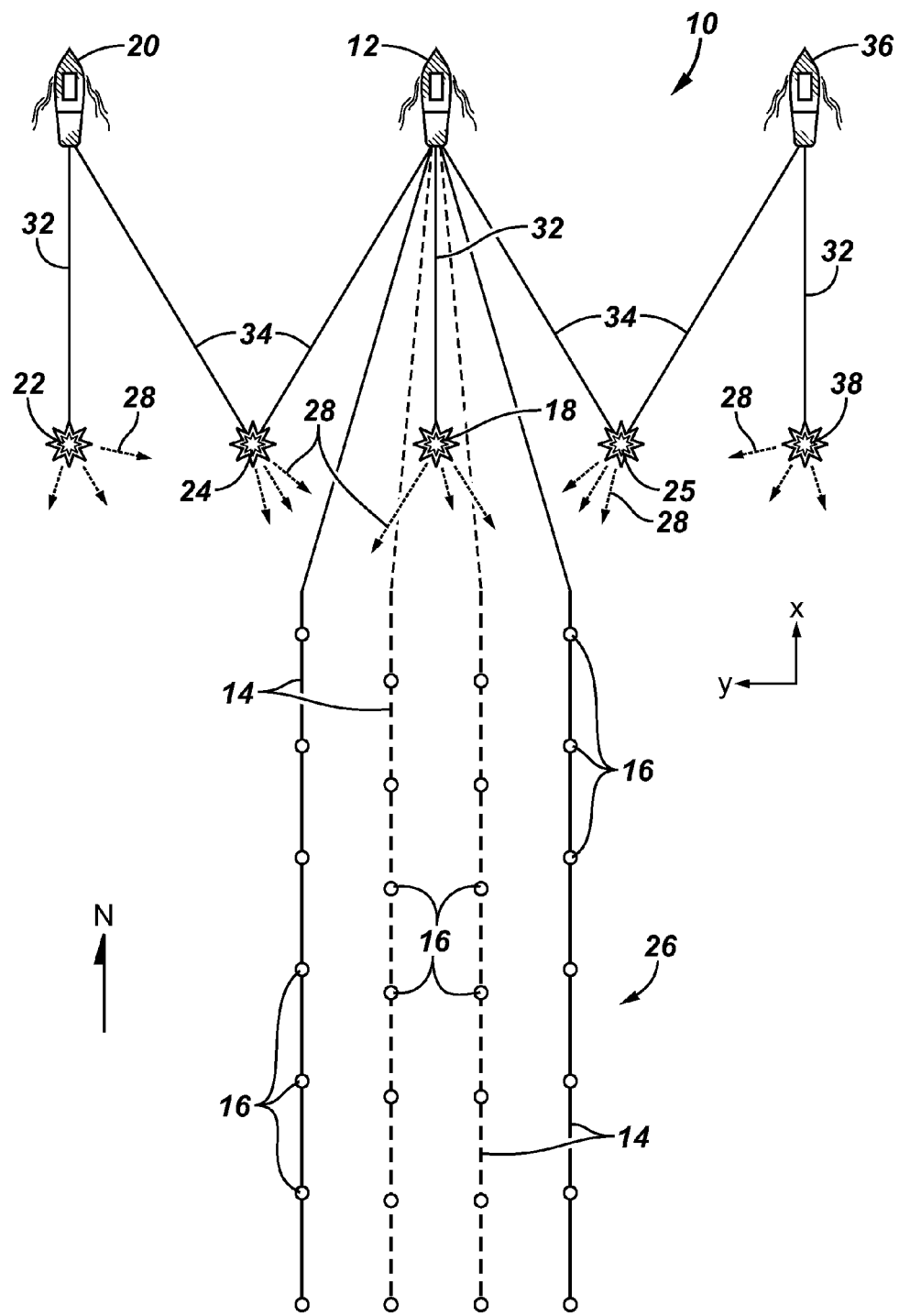
FIG. 2 is a conceptual, schematic view of another embodiment of a system according to one or more aspects of the present disclosure.

FIG. 2 is a schematic depiction of system 10 according to one or more aspects of the present disclosure. System 10 depicts three tow vessels 12, 20, 36 deploying five offset sources 18, 22, 24, 25, 38. Sources 18, 22, 38 are each towed respectively by a sole dedicated vessel 12, 20, 36. Sources 24, 25 are supplemental offset sources. Supplemental offset source 24 is connected directly to vessel 12 by a supplemental tow member 34 and to vessel 20 by a supplemental tow member 34. Similarly, supplemental offset source 25 is towed jointly by tow vessels 12 and 36.

The embodiments depicted in FIGS. 1 and 2 are representative of systems 10 according to one or more aspects of the present disclosure. As previously stated, various modifications may be made without departing from the scope of the present disclosure. For example, streamers 14 and receivers 16 may be towed by a streamer vessel that does not tow a primary source and/or that may not tow a supplemental source. For example, the primary sources (e.g., towed by a sole dedicated vessel) and/or supplemental offset sources may be towed by vessels that do not tow streamer array 26. According to one or more aspects of the present disclosure, one or more streamers 14 may be deployed, for example, as ocean bottom systems and may not be towed as depicted in FIGS. 1 and 2.

According to one or more aspects of the present disclosure, a marine seismic system may include two vessels and three sources, the three sources deployed offset from one another in a cross-line direction from the two vessels. The system may include a streamer carrying a receiver. The streamer may be towed. The streamer may be towed by one of the first or the second vessels.

A wide-azimuth marine seismic survey system according to one or more aspects of the present disclosure may include a streamer array; a first source towed from a first vessel; a second source towed from a second vessel; and a supplemental offset source towed from the first vessel and the second vessel. The streamer array may be towed. The streamer array may be towed for example from the first vessel. The sources may be offset from each other by at least 100 meters. According to one or more aspects of the present disclosure, the sources are offset from each other in excess of 200 meters.

The system may include a third vessel towing a third source. The system may include a second supplemental offset source towed, for example, jointly by the third vessel and one of the first vessel or the second vessel.

A method according to one or more aspects of the present disclosure comprises deploying a streamer array having receivers; towing a first source from a first vessel; towing a second source from a second vessel; and towing a supplemental source offset from the first source and offset from the second source.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A marine seismic system comprising:
   two vessels; and three sources deployed, wherein the three sources are deployed offset from one another in a cross-line direction;

wherein a first source of the three sources is towed solely by a first vessel of the two vessels, the first source including all sources towed solely from the first vessel;

wherein a second source of the three sources is towed solely by a second vessel of the two vessels, the second source including all sources towed solely by the second vessel;

wherein a third source of the three offset sources is connected to one of the two vessels by a first tow member and connected to the other of the two vessels by a second tow member; and wherein the marine seismic system comprises a ratio of less than one vessel per offset source.

2. The system of claim 1, further comprising a streamer carrying a receiver.

3. The system of claim 1, further comprising a streamer carrying a receiver, the streamer deployed by one of the two vessels.

4. The system of claim 1, further comprising:
a third vessel;
a fourth source towed solely from the third vessel, wherein the fourth source includes all the sources towed solely from the third vessel and wherein the fourth source is offset in the cross-line direction from the three sources; and
a fifth source towed jointly from the third vessel and one of the two vessels, wherein the fifth source is offset in the cross-line direction the three sources and the fourth source.

5. The system of claim 4, further comprising a streamer carrying a receiver, the streamer deployed by one of the two vessels.

6. A wide-azimuth marine seismic survey system, the system comprising:
a streamer array;
a first source towed solely from a first vessel, wherein the first source includes all sources towed solely by the first vessel;
a second source towed solely from a second vessel, wherein the second source includes all sources towed solely by the second vessel; and
a supplemental offset source towed jointly from the first vessel and the second vessel, wherein the first source, the second source and the supplemental offset source are offset from one another in a cross-line direction and wherein the wide-azimuth marine seismic survey system comprises a ratio of less than one vessel per offset source.

7. The system of claim 6, wherein the streamer array is towed from the first vessel.

8. The system of claim 6, wherein the sources are offset from each other in the cross-line direction of at least 100 meters.

9. The system of claim 6, wherein the sources are offset from each other in the cross-line direction in excess of at least 200 meters.

10. The system of claim 9, wherein the streamer array is towed.

11. The system of claim 6, further comprising a third vessel towing a fourth source.

12. The system of claim 6, further comprising:
a third source towed solely by a third vessel, wherein the third source includes all of the sources towed solely by the third vessel; and
a second supplemental offset source towed jointly by the third vessel and one of the first vessel or the second vessel.

13. The system of claim 12, wherein the streamer array is towed.

14. The system of claim 12, wherein the streamer array is towed by the first vessel.

15. A marine seismic survey method comprising:
deploying a marine seismic survey system comprising:
deploying a streamer array having receivers;
towing a first source solely from a first vessel, wherein the first source includes all sources towed solely by the first vessel;
towing a second source solely from a second vessel, the second source offset from the first source in a cross-line direction, wherein the second source includes all sources towed solely from the second vessel; and
towing a supplemental source offset in the cross-line direction from the first source and from the second source, wherein the supplemental source is connected to the first vessel by a first tow member and the supplemental source is connected to the second vessel by a second tow member, wherein the marine seismic survey system comprises a ratio of less than one vessel per offset source.

16. The method of claim 15, wherein deploying a streamer array comprises towing the streamer array.

17. The method of claim 16, wherein the streamer array is towed by one of the first vessel or the second vessel.

\* \* \* \* \*